(12) United States Patent
Olson

(10) Patent No.: US 10,267,000 B2
(45) Date of Patent: Apr. 23, 2019

(54) DEBRIS BLOWER SYSTEM

(71) Applicant: Merlin L. Olson, Lengby, MN (US)

(72) Inventor: Merlin L. Olson, Lengby, MN (US)

( * ) Notice: Subject to any disclaimer, the term of this patent is extended or adjusted under 35 U.S.C. 154(b) by 107 days.

(21) Appl. No.: 15/591,539

(22) Filed: May 10, 2017

(65) Prior Publication Data

US 2018/0327987 A1 Nov. 15, 2018

(51) Int. Cl.
| | | |
|---|---|---|
| *E01H 1/08* | (2006.01) | |
| *E02F 3/76* | (2006.01) | |
| *E02F 9/22* | (2006.01) | |
| *F04D 17/16* | (2006.01) | |
| *F04D 25/02* | (2006.01) | |
| *F04D 29/62* | (2006.01) | |
| *F04D 29/44* | (2006.01) | |
| *E02F 3/96* | (2006.01) | |
| *A01G 20/43* | (2018.01) | |
| *F04D 25/04* | (2006.01) | |
| *A01G 20/47* | (2018.01) | |
| *E02F 3/815* | (2006.01) | |

(52) U.S. Cl.
CPC ........... *E01H 1/0809* (2013.01); *A01G 20/43* (2018.02); *A01G 20/47* (2018.02); *E02F 3/7636* (2013.01); *E02F 3/961* (2013.01); *F04D 17/16* (2013.01); *F04D 25/02* (2013.01); *F04D 25/04* (2013.01); *F04D 29/441* (2013.01); *F04D 29/624* (2013.01); *E02F 3/815* (2013.01)

(58) Field of Classification Search
CPC ..... E02H 1/0809; A01G 20/43; E02F 3/7636; E02F 3/961; E02F 9/22; E02F 3/815; E02F 9/2221; F04D 17/16; F04D 25/02; F04D 29/441; F04D 29/624

See application file for complete search history.

(56) References Cited

U.S. PATENT DOCUMENTS

| | | | |
|---|---|---|---|
| 3,403,856 A | 10/1968 | Greenwood | |
| 4,700,534 A | 10/1987 | Reilly | |
| 4,885,852 A | 12/1989 | Gudmundsson | |
| 5,090,088 A | 2/1992 | Toth | |
| 5,119,619 A | 6/1992 | Zappia | |
| 6,226,833 B1 * | 5/2001 | Kawaguchi | A47L 5/14 15/405 |
| 6,681,443 B1 | 1/2004 | Bourgeois | |
| 8,387,205 B2 * | 3/2013 | Weihl | A01D 42/06 15/347 |
| 8,579,058 B1 * | 11/2013 | Yamada | A01D 43/00 180/53.8 |

(Continued)

*Primary Examiner* — Dung Van Nguyen
(74) *Attorney, Agent, or Firm* — Neustel Law Offices

(57) ABSTRACT

A debris blower system for clearing debris from the path of a road grader. The debris blower system generally includes a mounting platform configured to mount to a road grader, a blower unit attached to the mounting platform, an exhaust tube attached to the blower unit, and a motor attached to the mounting platform. The exhaust tube may be configured to rotate relative to the blower unit to alter the flow of air from the blower unit. The motor is configured to rotate the exhaust tube and alter the direction of air from the blower, which is generally to a road surface in front of a road grader. The debris blower system may also be attached to a lifter, which permits the mounting platform to be raised and lowered to further control the outflow of air from the blower unit.

20 Claims, 15 Drawing Sheets

(56) References Cited

U.S. PATENT DOCUMENTS

| | | | |
|---|---|---|---|
| 9,510,516 B2* | 12/2016 | Shumaker | B08B 5/02 |
| 9,986,692 B2* | 6/2018 | Kinkead | A01G 20/43 |
| 2007/0199175 A1 | 8/2007 | Syracuse | |
| 2012/0246865 A1* | 10/2012 | Lauer | A01D 42/06 |
| | | | 15/405 |
| 2014/0157744 A1 | 6/2014 | Anderson | |
| 2016/0120131 A1* | 5/2016 | Conrad | F04D 17/16 |
| | | | 15/319 |
| 2017/0112071 A1* | 4/2017 | Shumaker | B60R 11/00 |

* cited by examiner

DEBRIS BLOWER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a debris blower system for removing debris from a road surface prior to grading it by a road grader.

Related Art

Any discussion of the related art throughout the specification should in no way be considered as an admission that such related art is widely known or forms part of common general knowledge in the field.

It is often necessary to maintain a gravel road by periodically using a road grader to maintain the shape and flatness of the gravel surface. Typically, the road grader will run a blade (also known as a moldboard) along the surface of the road surface to smooth out any high spots and fill in any low spots on each side of the road surface. However, it is often the case that a road in need of maintenance may be covered with debris, such as leaves, branches, and lawn clippings. This can happen when grass in an adjacent ditch or nearby land is cut using a brush mower. This presence of this debris inhibits the operation of the road grader and may diminish the quality of the graded road surface because debris is inferior to gravel as a road surface.

One way to deal with debris on the road surface would be to remove it prior to attempting to grade the road surface. This typically requires another piece of machinery and/or intensive manual labor. Another problem with this method of debris removal is the debris is that removed debris can quickly find its way back on to the road surface unless the debris is collected rather than moved aside. In some cases, nearby land is being mowed at the same time as the road grader is being used. It is generally not possible to coordinate mowing times along miles of gravel roads to avoid the accumulation of debris during the road grading process. Moreover, normal vehicle traffic on the gravel road can also disturb removed debris and place it back onto the road surface being graded. Accordingly, the process of clearing the road and grading the road must be conducted in short stretches, which greatly increases the time needed to maintain the road surface.

Another way to deal with debris on the road surface is to simply grade the road surface despite its presence. However, this results in a degraded road surface as the debris is merged with the road. In the case of organic debris like lawn clippings, this tends to cause plant growth within the road, which further degrades the road surface. In addition, some of the debris will buildup on the moldboard of the road grader as it operates, which will inhibit its ability to function. Consequently, the operator of the road grader must continually interrupt the process of grading the road to remove any excess buildup of debris. These interruptions greatly increase the time needed to maintain the road surface.

What is needed is an apparatus that can remove debris from a road surface immediately prior to it being graded by a road surface.

SUMMARY

An example embodiment is directed to a debris blower system. The debris blower system generally includes a mounting platform configured to mount to a road grader, a blower unit attached to the mounting platform, an exhaust tube attached to the blower unit, and a motor attached to the mounting platform. The exhaust tube may be configured to rotate relative to the blower unit to alter the flow of air from the blower unit. The motor is configured to rotate the exhaust tube and alter the direction of air from the blower, which is generally to a road surface in front of a road grader. The debris blower system may also be attached to a lifter, which permits the mounting platform to be raised and lowered to further control the outflow of air from the blower unit.

There has thus been outlined, rather broadly, some of the embodiments of the debris blower system in order that the detailed description thereof may be better understood, and in order that the present contribution to the art may be better appreciated. There are additional embodiments of the debris blower system that will be described hereinafter and that will form the subject matter of the claims appended hereto. In this respect, before explaining at least one embodiment of the debris blower system in detail, it is to be understood that the debris blower system is not limited in its application to the details of construction or to the arrangements of the components set forth in the following description or illustrated in the drawings. The debris blower system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1A:
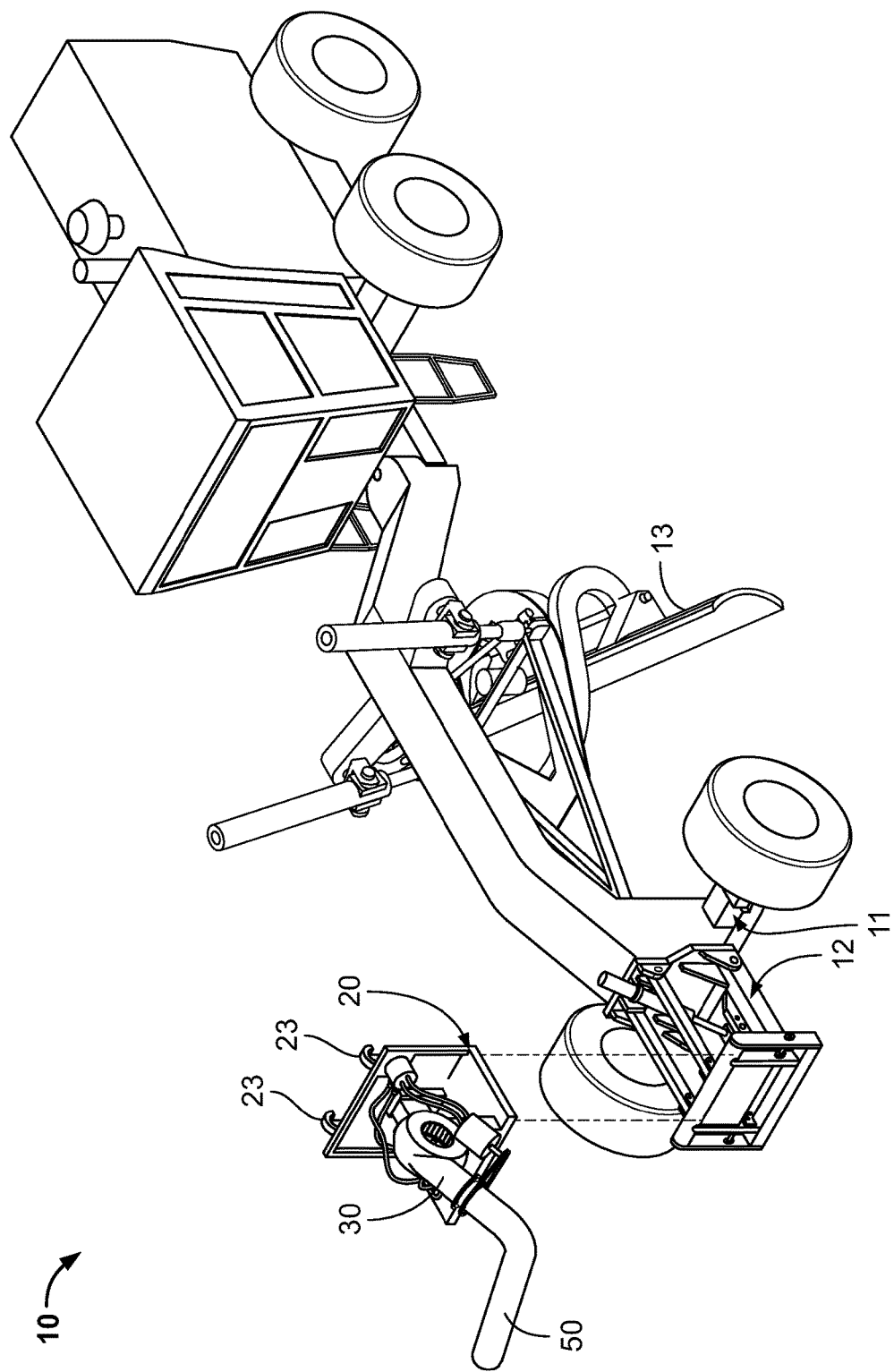
FIG. 1A is a perspective view of a debris blower system in accordance with an example embodiment that is being attached to a lifter on the front end of a road grader.

Turning now descriptively to the drawings, in which similar reference characters denote similar elements throughout the several views, FIGS. 1A through 14 illustrate a debris blower system, which comprises a mounting platform 20 configured to mount to a lifter 12 that is attached to the front end 11 of a road grader 10; a blower unit 30 attached to the mounting platform 20; an exhaust tube 50 comprising an inflow end 51 and an outflow end 52, wherein, the inflow end 51 of the exhaust tube 50 is coupled to the blower unit 30 in a manner that permits it to rotate relative to the blower unit 30; wherein the exhaust tube 50 comprises at least one bend between the inflow end 51 and the outflow end 52; and a motor 40 attached to the mounting platform 20, coupled to the exhaust tube 50 and configured to cause rotation of the inflow end 51 of the exhaust tube 50 relative to the blower unit 30 to control the orientation of the outflow end 52 of the exhaust tube 50.

B. Mounting Platform

Generally, the various components of a disclosed debris blower system are directly or indirectly coupled to a mounting platform 20, as shown in FIGS. 1A through 14. The mounting platform 20 generally comprises a vertical portion 21 and a horizontal portion 22. The vertical portion 21 of the mounting platform 20 is generally configured to removably attach the mounting platform 20 to a road grader 10. The horizontal portion 22 of the mounting platform 20 is generally configured to support other components of a debris blower system. However, components of the debris blower system, such as a control unit 60 may be supported by the vertical portion 21 of the debris blower system.

The terms "vertical portion" and "horizontal portion" are used as points of reference on the mounting platform 20. However, embodiments of the debris blower system are not limited to the configuration shown in FIGS. 1A through 14. In some embodiments, the horizontal portion 22 and the vertical portion 21 may not meet at a clearly defined corner, wherein the mounting platform 20 is configured as one continuous structure. Furthermore, the horizontal portion 22 and vertical portion 21 may not form a right angle. For example, in other embodiments, the mounting platform 20 is configured as a hook with no clear demarcation between a horizontal portion 22 and a vertical portion 21. Furthermore, to the extent that a particular road grader 10 utilizes a non-planar mounting surface, the vertical portion 21 may have a complementary non-planar configuration.

Figure 1B:
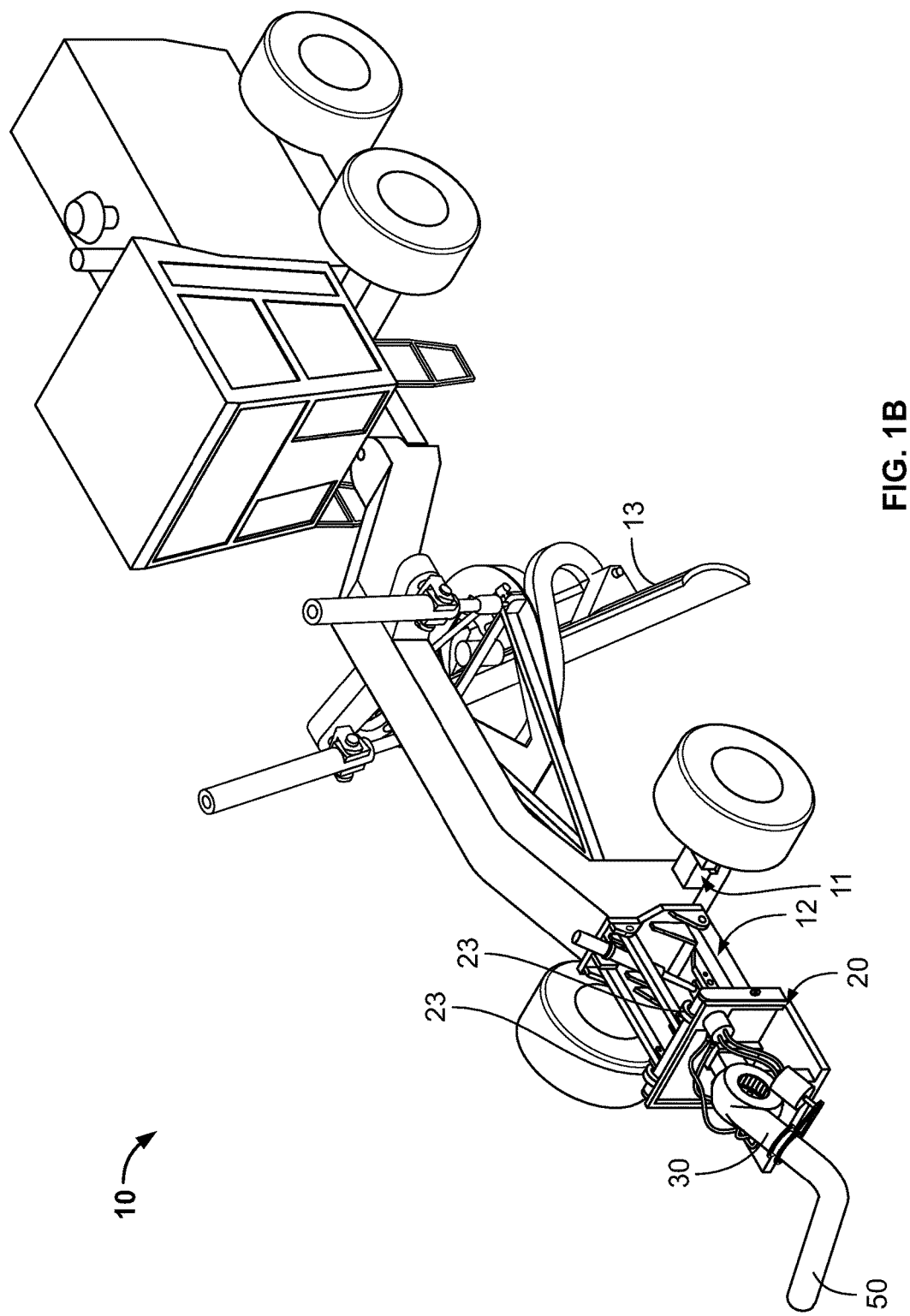
FIG. 1B is a perspective view of a debris blower system in accordance with an example embodiment that is attached to a lifter on the front end of a road grader.
Figure 6:
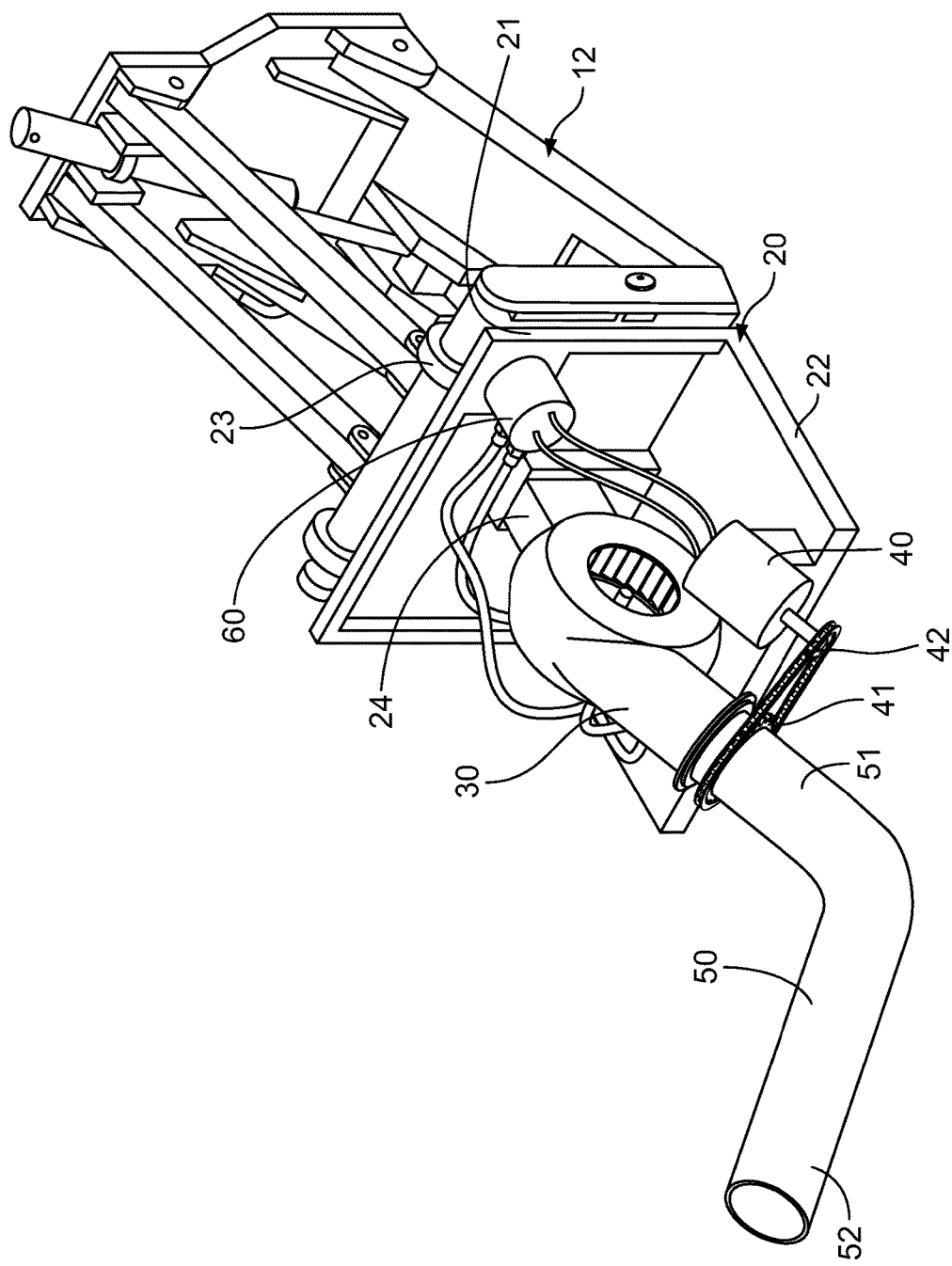
FIG. 6 is a perspective view of a debris blower system in accordance with an example embodiment that is attached to a lifter and has been raised by the lifter.
Figure 7:
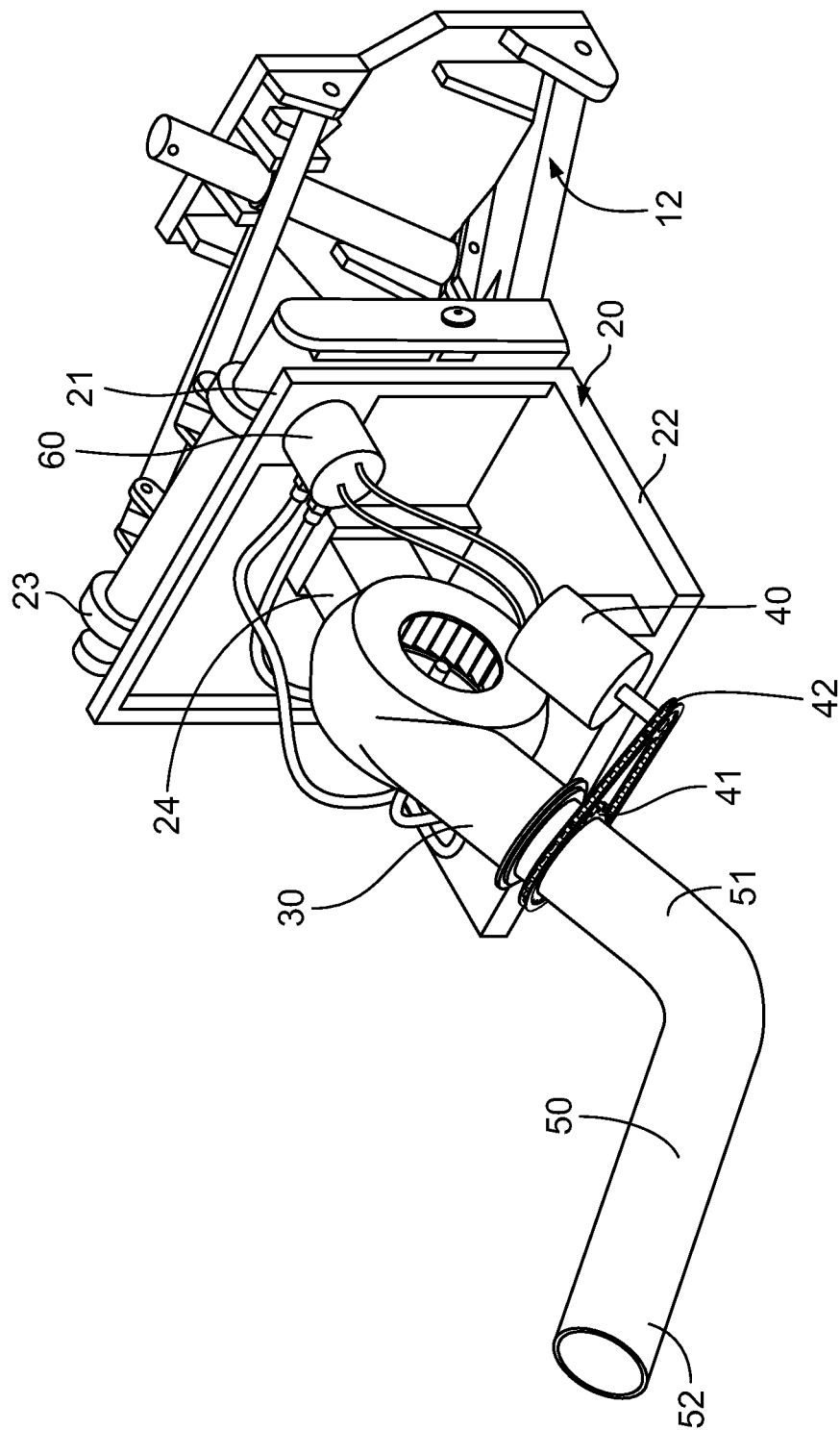
FIG. 7 is a perspective view of a debris blower system in accordance with an example embodiment showing the outflow end of the exhaust tube directed upwards.

The vertical portion 21 of a mounting platform 20 generally comprises one or more connectors 23 as shown in FIGS. 1A, 1B and 6, for example. These connectors 23 are generally configured to attach to the attachment mechanism provided by a road grader 10. The embodiments shown in FIGS. 1A and 1B illustrate a debris blower system configured to attach to a lifter 12 on the front end 11 of a road grader 10. In this embodiment, the connectors 23 have a hook shape, which permits removable attachment to a lifter 12 which has a horizontal bar. However, in other embodiments the connectors 23 may comprise tabs or pins configured to couple with corresponding slots on a road grader 10 or its lifter 12. In still other embodiments, the connectors 23 comprise slots that are configured to mate with corresponding tabs or pins on a road grader 10 or its lifter 12.

The vertical portion 21 of the mounting platform 20 may comprise a control unit 60, which is configured to couple with the operator controls of the road grader 10. Generally, the control unit 60 is configured to receive signals from the operator of a road grader 10 and translate and/or transmit those signals to the active components of the debris blower system, such as the blower unit 30 and motor 40. In some embodiments, the control unit 60 is coupled to operator controls via wires or cables, which may occur directly or may occur indirectly via controls for the lifter 12 or other components of the road grader 10. In some embodiments, the control unit 60 is coupled to operator controls at least partially wirelessly. In some embodiments, the control unit 60 is configured to route signals to the lifter 12. In other embodiments, the control unit 60 may be configured to route power to other components of the debris blower system in addition to control signals. In some embodiments, there is no control unit 60 and the active components of the debris blower system are controlled directly.

The horizontal portion 22 of the mounting platform 20 is generally configured to support the components of the debris blower system, which may also include the vertical portion 21 of the debris blower system. In the embodiments shown in FIGS. 1A through 14, the horizontal portion 22 forms a plane and directly supports a blower unit 30, hydraulic flow control 61, and a motor 40. In other embodiments, some or all of these components may be attached directly to the vertical portion 21 of the mounting platform 20, or the horizontal portion 22 may be comprised of multiple surfaces. The horizontal portion 22 may also comprise a non-planar shape such as a bowl. In other embodiments, components of the debris blower system may be supported by other components of the debris blower system.

Figure 12:
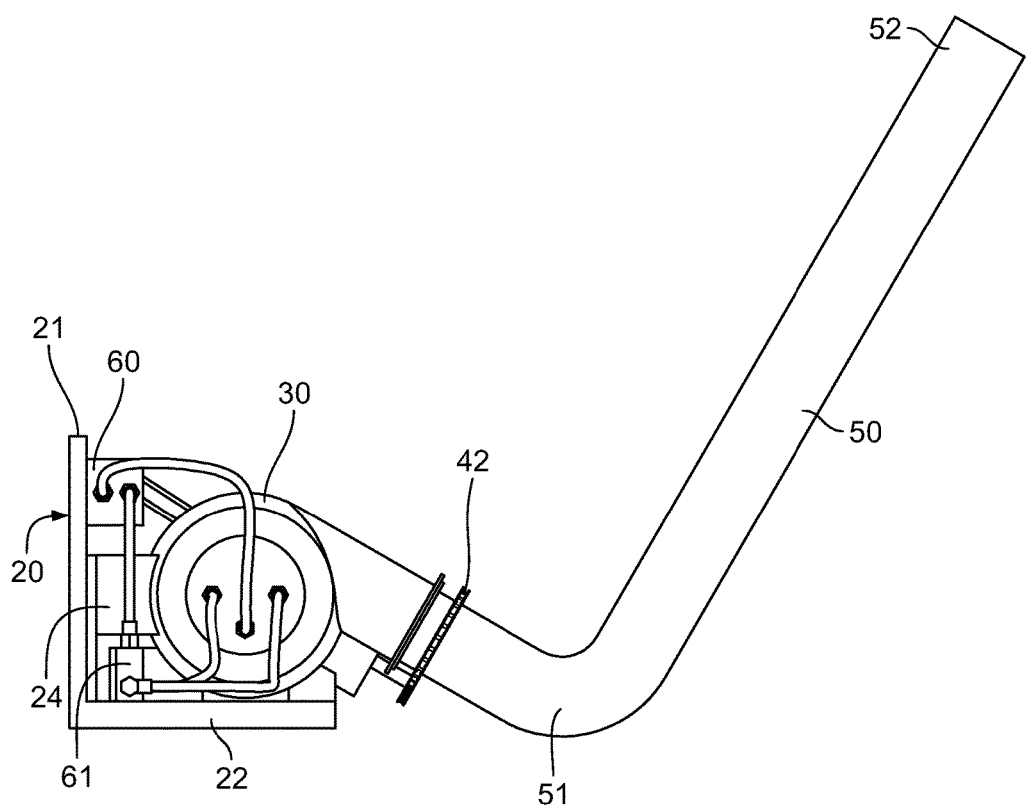
FIG. 12 is a side-view of a debris blower system in accordance with an example embodiment showing the outflow end of the exhaust tube directed upwards.
Figure 13:
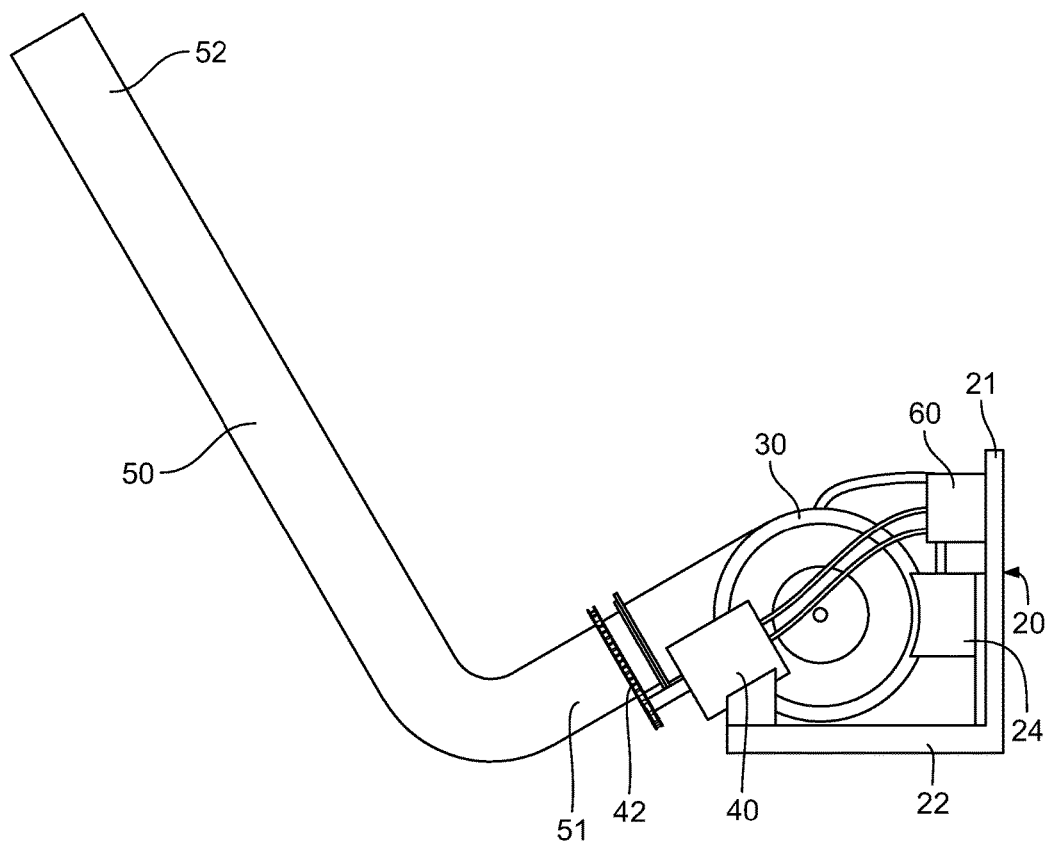
FIG. 13 is an opposite-side view of a debris blower system in accordance with an example embodiment showing the outflow end of the exhaust tube directed upwards.
Figure 14:
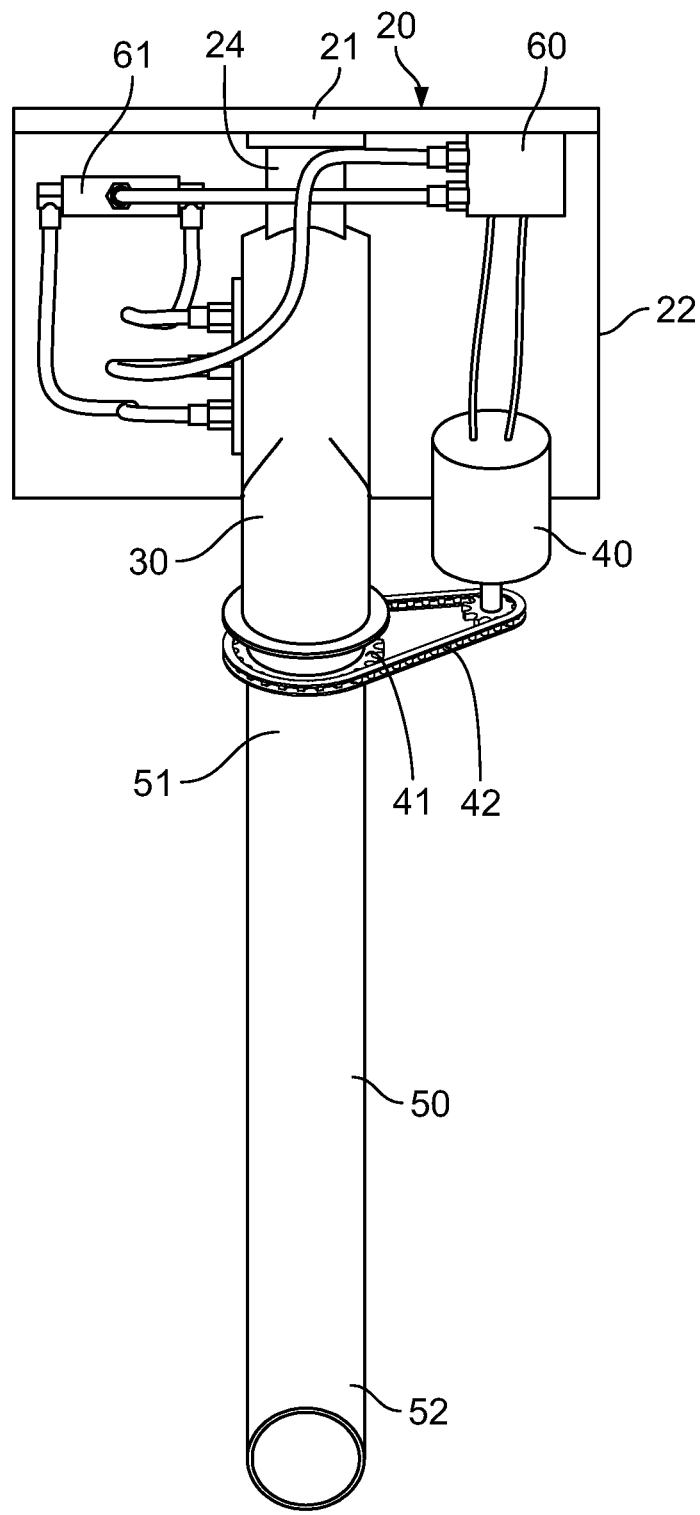
FIG. 14 is a top-down view of a debris blower system in accordance with an example embodiment showing the outflow end of the exhaust tube directed upwards.

The mounting platform 20 may include a blower unit adapter 24, which permits the coupling of a blower unit 30 to the mounting platform 20 when the blower unit 30 and the mounting platform 20 do not possess a complementary shape. As best shown in FIGS. 12 through 14, a blower unit 30 with a rounded surface may not easily mate with a mounting platform 20 that is generally comprised of flat surfaces. A blower unit adapter 24 may be used to improve the coupling between a blower unit 30 and a mounting platform 20. In the embodiments shown in FIGS. 12 through 14, a blower unit adapter 24 is attached to the vertical portion 21. However, in other embodiments, a blower unit adapter 24 may be attached to the horizontal portion 22 instead of or in addition to the vertical portion 21.

C. Blower Unit

The disclosed debris blower system generally includes a blower unit 30 attached to the mounting platform 20. In some embodiments, the functionality of the mounting platform 20 is directly integrated into the blower unit 30. If needed, the blower unit 30 may be coupled to the mounting platform 20 using a blower unit adapter 24. The blower unit 30 is generally coupled to a controller unit, which relays control signals from an operator to the blower unit 30. These control signals may direct the on/off state of the blower unit 30 as well as the speed of the blower unit 30. In the case of a hydraulic blower unit 30, the blower unit 30 may be coupled to a hydraulic flow control 61, which improves the operation of a hydraulic blower unit 30.

D. Exhaust Tube

The blower unit 30 of a disclosed debris blower system is generally coupled to an exhaust tube 50. The exhaust tube 50 has an inflow end 51 and an outflow end 52. The inflow end 51 is coupled to the blower unit 30 and is configured to receive forced air from the blower unit 30. The coupling between the blower unit 30 and the inflow end 51 of the exhaust tube 50 permits rotation of the inflow end 51 of the exhaust tube 50 relative to the blower unit 30. This coupling may comprise one or more bushings, ball bearings, or other means for providing a rotatable coupling between the exhaust tube 50 and the blower unit 30.

The inflow end 51 of the exhaust tube 50 may comprise a sprocket 41 that is coupled at or near the inflow end 51 of the exhaust tube 50. In the embodiments shown in FIGS. 8 through 10, a sprocket 41 is attached to the exhaust tube 50 such that rotation of the sprocket 41 will cause rotation of the inflow end 51 of the exhaust tube 50 without detaching the exhaust tube 50 from the blower unit 30. The sprocket 41 is generally coupled to the motor 40 using a chain 42, such that the motor 40 can indirectly control the rotation of the exhaust tube 50.

The exhaust tube 50 also comprises an outflow end 52 which is configured to expel forced air from the debris blower system. Generally, the exhaust tube 50 comprises at least one bend between the inflow end 51 and the outflow end 52. This bend is generally configured such that rotation of the inflow end 51 of the exhaust tube 50 alters the orientation of the outflow end 52 of the exhaust tube 50. As shown, in FIGS. 8 through 10, the outflow end 52 can be directed upwards and to either side of the debris blower system. Although these figures illustrate three orientations for the outflow end 52 of the exhaust tube 50, the disclosed debris blower system is generally capable of rotating to any possible orientation limited only by the overall precision of the debris blower system, the axis of rotation, and any physical obstructions.

Figure 8:
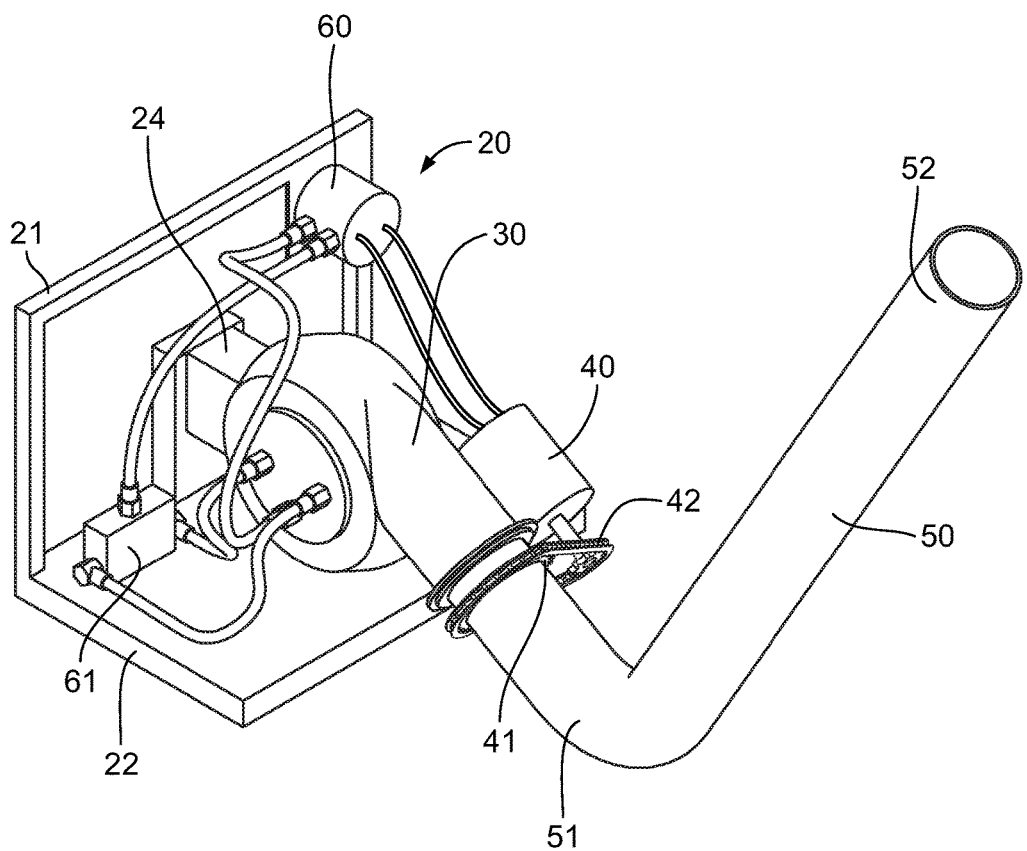
FIG. 8 is an alternate perspective view of a debris blower system in accordance with an example embodiment showing the outflow end of the exhaust tube directed upwards.
Figure 9:
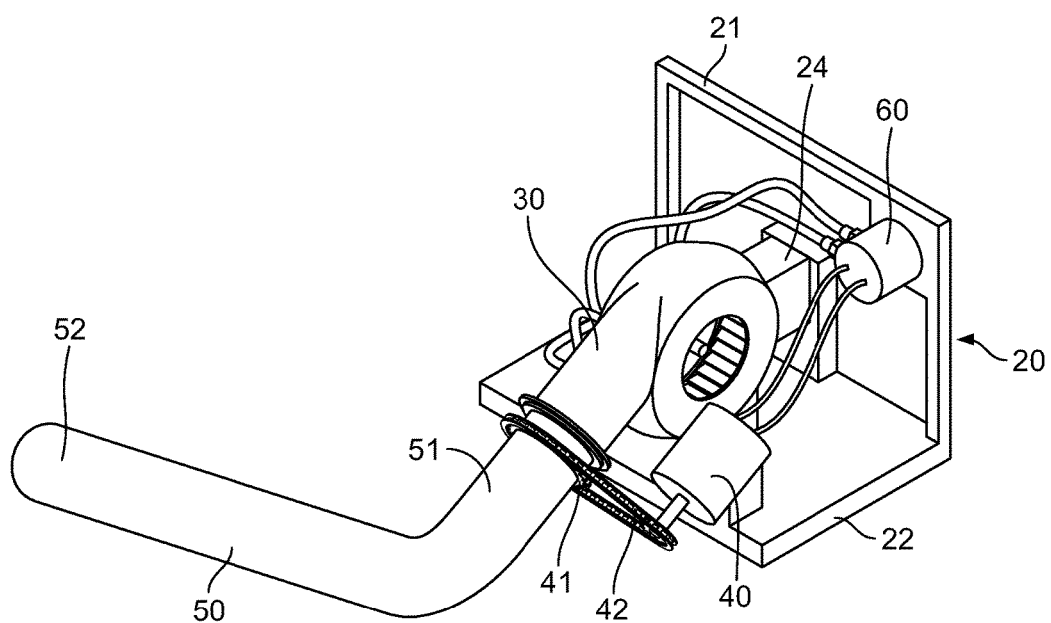
FIG. 9 is a perspective view of a debris blower system in accordance with an example embodiment showing the outflow end of the exhaust tube directed to a side of the debris blower system.
Figure 10:
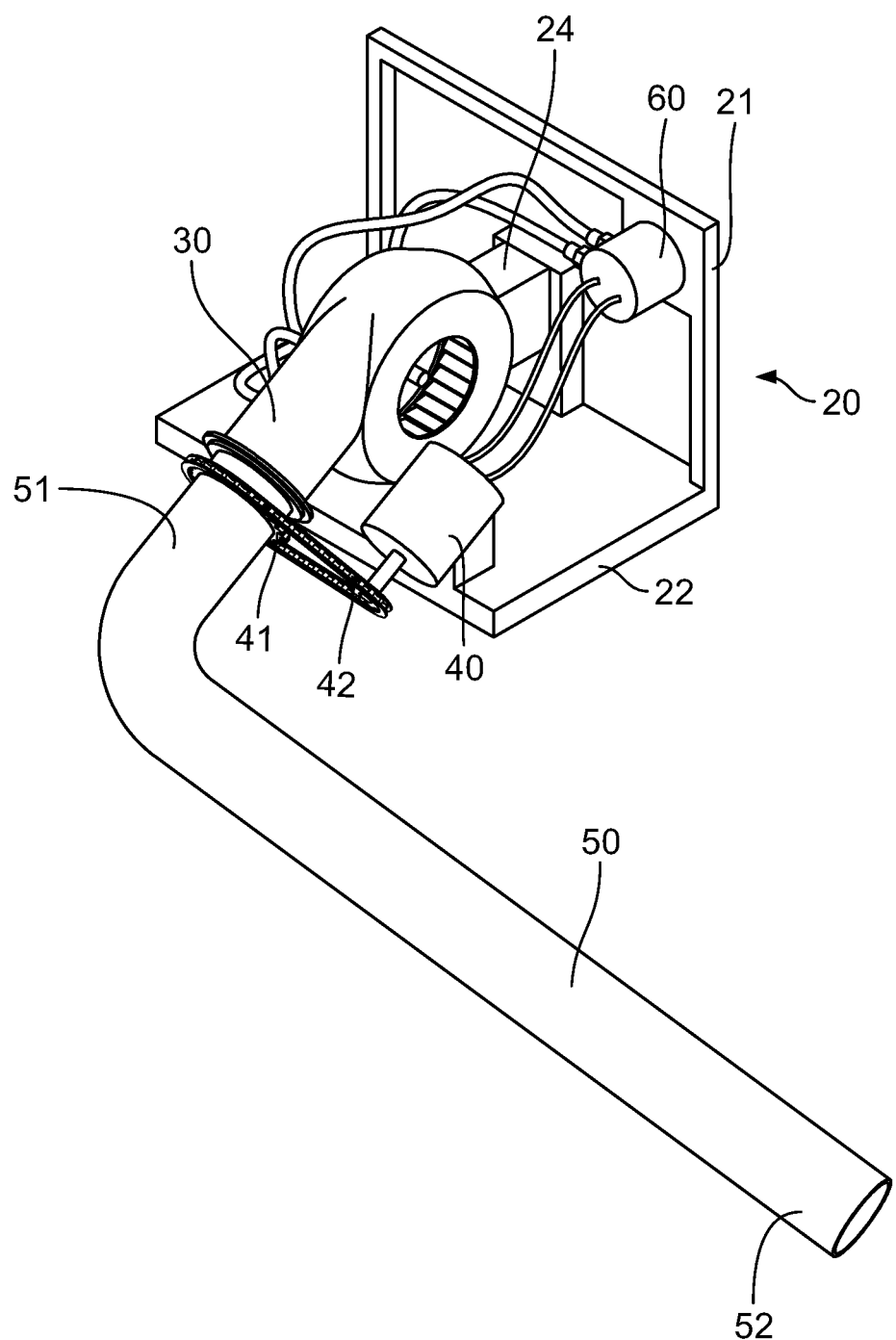
FIG. 10 is a perspective view of a debris blower system in accordance with an example embodiment showing the outflow end of the exhaust tube directed to the opposite side of the debris blower system.
Figure 11:
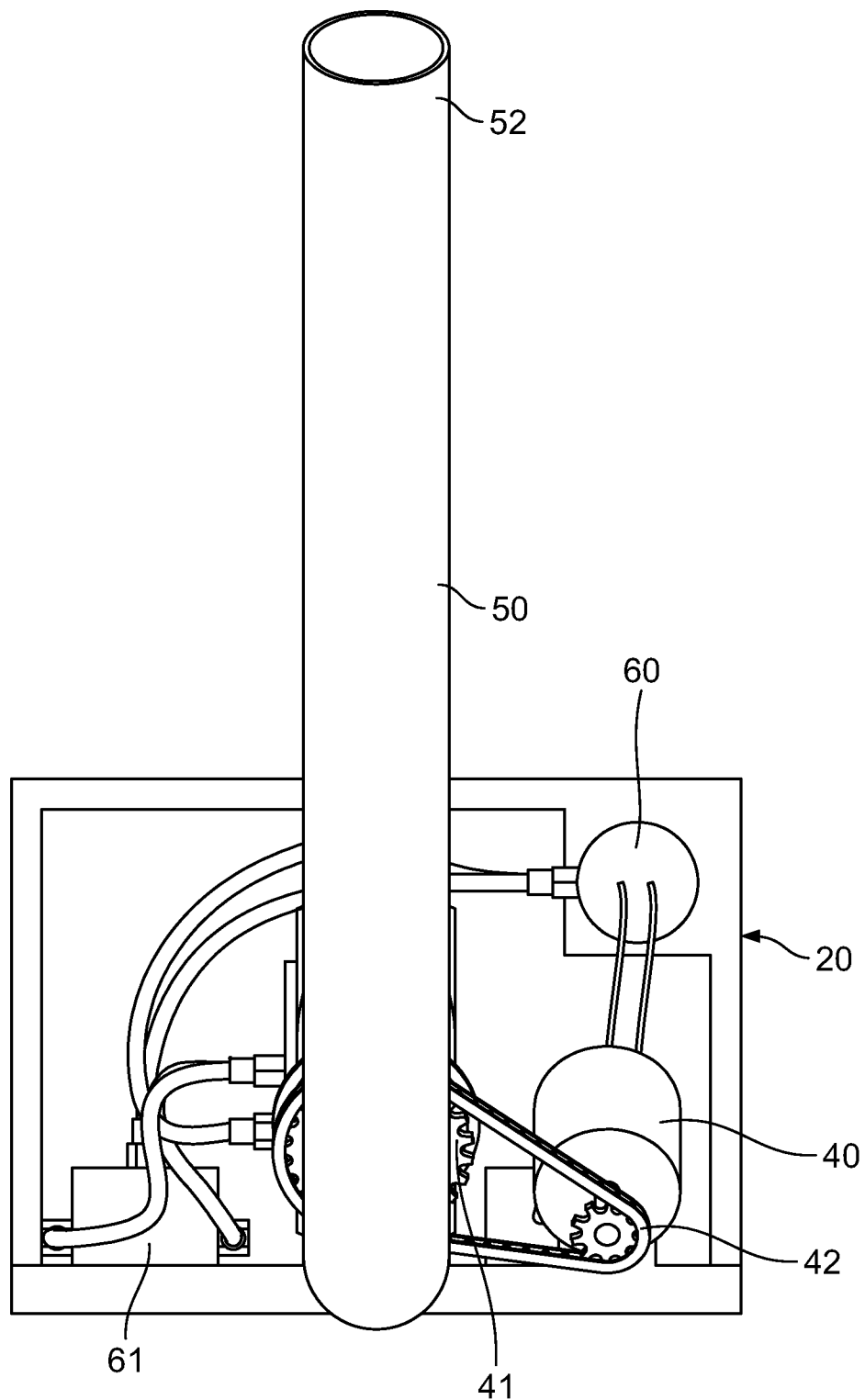
FIG. 11 is a front-view of a debris blower system in accordance with an example embodiment showing the outflow end of the exhaust tube directed upwards.

In the embodiment shown in FIGS. 8 through 10, the output of the blower unit 30 is directed downwards, which results in the permissible orientations of the outflow end 52 of the exhaust tube 50 being centered along this direction. In other embodiments, the blower unit 30 is directed perpendicular to the horizontal portion 22 of the mounting platform 20. In other embodiments, the blower unit 30 is biased to a side of the mounting platform 20 of the debris blower system. In other embodiments, the output of the blower unit 30 is redirected using one or more tubes prior to it being coupled to the inflow end 51 of the exhaust tube 50.

E. Motor

The disclosed debris blower system generally comprises a motor 40 coupled to an exhaust tube 50. The motor 40 is coupled to the exhaust tube 50 such that it can rotate the inflow end 51 of the exhaust tube 50, which is coupled to the blower unit 30, to direct the outflow of the exhaust tube 50 in a desired direction. The motor 40 is generally coupled to a control unit 60, which may supply control signals as well as power to the motor 40. In some embodiments, the motor 40 has an independent power source and uses the control unit 60 only for control signals. In the embodiment shown in FIGS. 8 through 10, the motor 40 is powered and controlled by a pair of wires coupled to the control unit 60.

In the embodiment shown in FIGS. 8 through 10, the exhaust tube 50 comprises a sprocket 41 near the inflow end 51 of the exhaust tube 50 that is coupled to the motor 40 using a chain 42 connecting the two. By operating the motor 40, the outflow end 52 of the exhaust tube 50 can be directed in different directions. In other embodiments, the motor 40 is coupled to the exhaust tube 50 using a belt. The motor 40 may also be coupled to a wheel that is configured to rotate the exhaust tube 50 via direct contact with the tube. In still other embodiments, the motor 40 is coupled to the exhaust tube 50 using a rack and pinion, or a plurality of gears.

F. Operation of Preferred Embodiment

Figure 2:
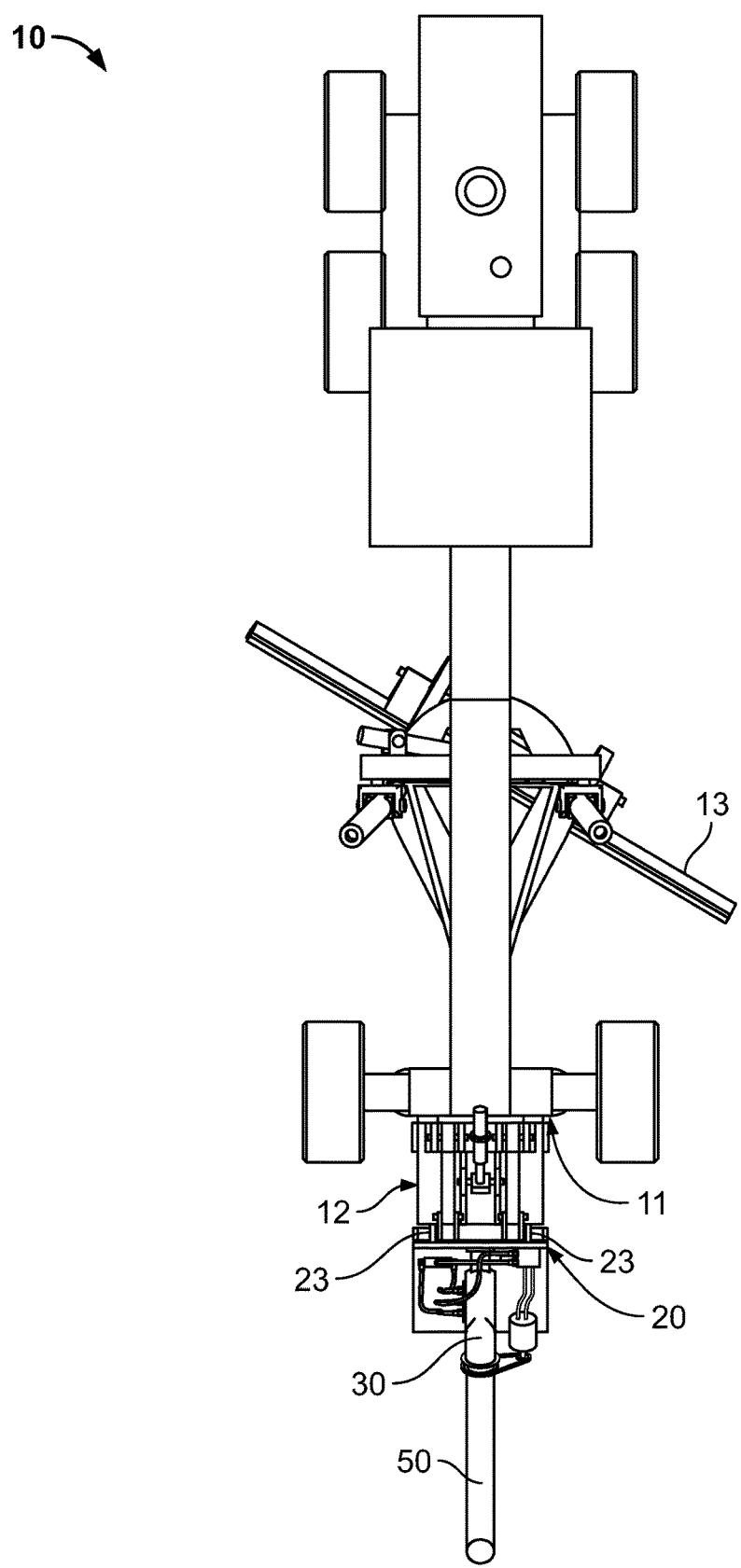
FIG. 2 is a top-down view of a debris blower system in accordance with an example embodiment that is attached to a lifter on the front end of a road grader showing the outflow end of the exhaust tube directed upwards.
Figure 3:
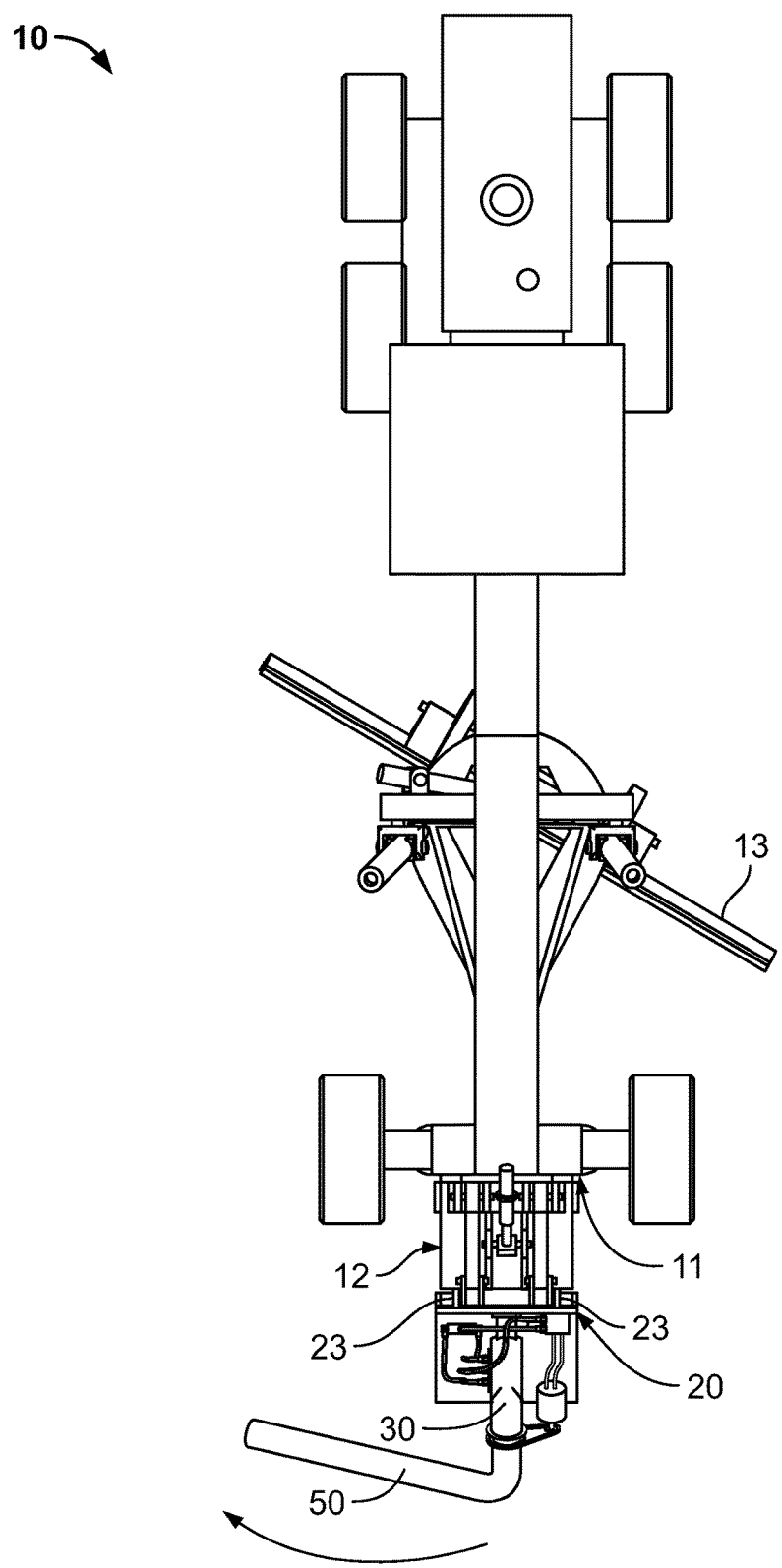
FIG. 3 is a top-down view of a debris blower system in accordance with an example embodiment that is attached to a lifter on the front end of a road grader showing the outflow end of the exhaust tube directed to the right as viewed from the cab of the road grader.
Figure 4:
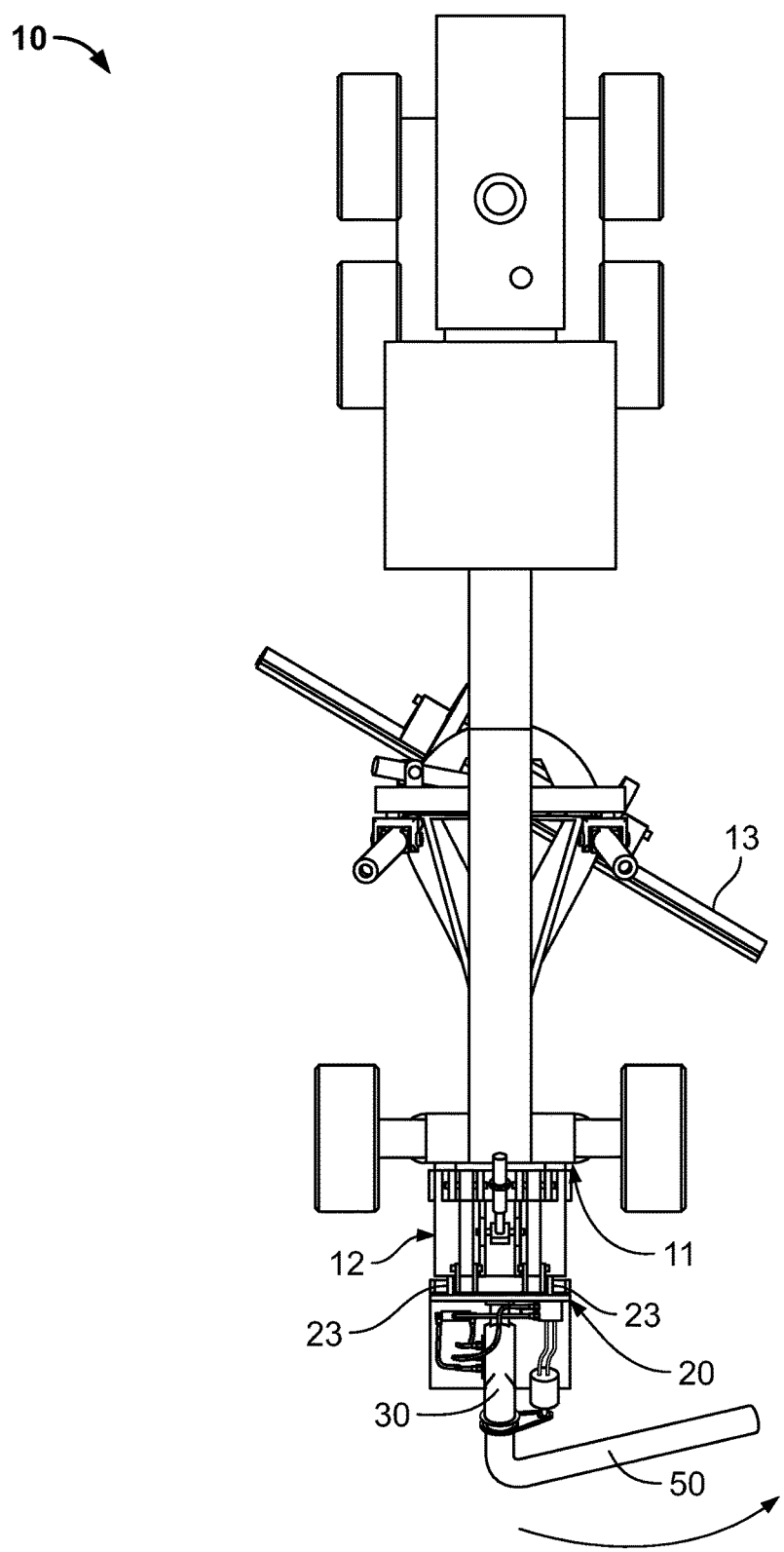
FIG. 4 is a top-down view of a debris blower system in accordance with an example embodiment that is attached to a lifter on the front end of a road grader showing the outflow end of the exhaust tube rotated to the left as viewed from the cab of the road grader.

In use, a debris blower system is generally coupled to the front end 11 of a road grader 10. As shown in FIGS. 1A through 2, a debris blower system may be attached to a lifter 12 that is coupled to the front end 11 of a road grader 10. Using one or more connectors 23, a debris blower system can be removably attached to the front end 11 of a road grader 10. As shown in FIG. 1A, some embodiments permit a debris blower system to simply be lowered from above and coupled as shown in FIG. 1B.

In order to use the debris blower system, an operator of the road grader 10 can send control signals to the motor 40 directing it to rotate the exhaust tube 50. This rotation will alter the direction of forced air from the blower unit 30 via the exhaust tube 50 to clear debris. The operator of the road grader 10 can activate the blower unit 30 as needed to clear any debris that is in front of the road grader 10. The debris blower system is generally operable independently of the road grader 10, so it can be used to clear debris from the path of the road grader 10 immediately before it is contacted by the blade 13 of the road grader 10. In the case of particularly stubborn debris, the road grader 10 can be stopped while permitting the debris blower system to continue to operate. This may be sufficient to clear this debris without requiring the operator of the road grader 10 to leave the vehicle.

Figure 5:
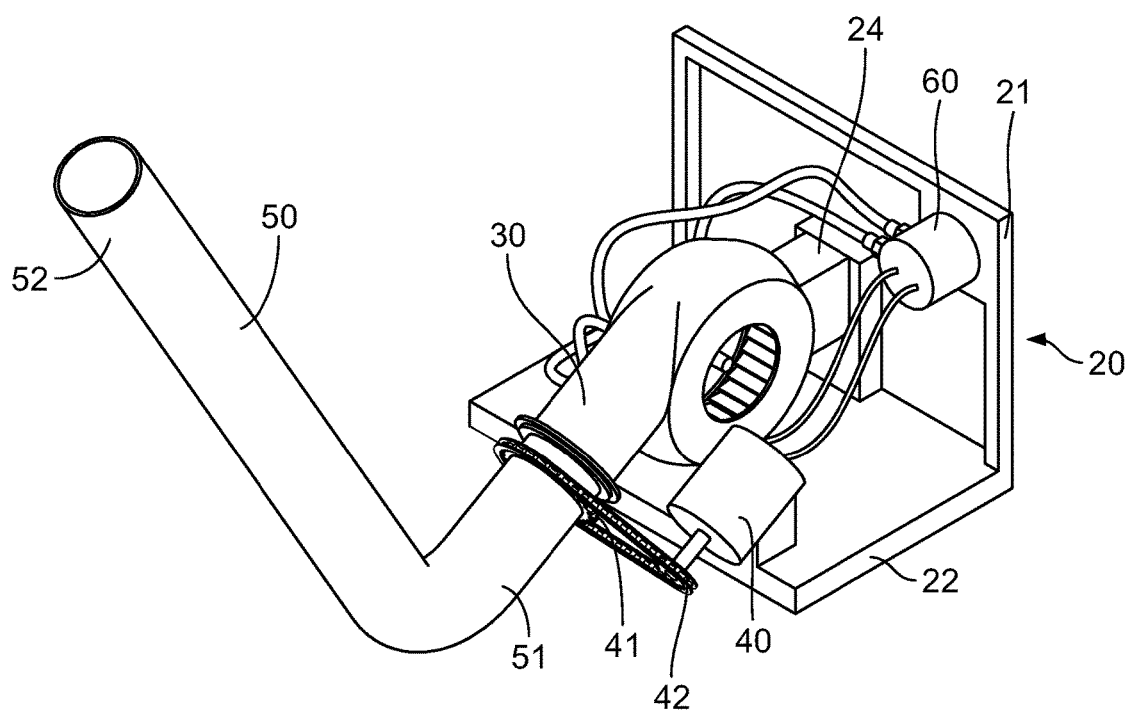
FIG. 5 is a perspective view of a debris blower system in accordance with an example embodiment that is attached to a lifter and has been lowered by the lifter.

The orientation of the exhaust tube 50 is generally chosen to clear debris from the path of blade 13 as it passes along a gravel road surface below the road grader 10. The debris blower system can also be raised or lowered using a lifter 12 to further control the direction of forced air, as shown in FIGS. 5 and 6. For example, if debris needs to be cleared towards a single side of a road grader 10, it may be desirable to lower the debris blower system so that forced air from the exhaust tube 50 is more closely aligned with the underlying road surface for greater debris clearing power. In other embodiments, it may be preferable to raise the debris blower system so that the exhaust tube 50 can be oriented downward without contacting the road surface. In this configuration, the exhaust tube 50 can be configured to reciprocate within a downward-facing arc by configuring the motor 40 to alternate directions periodically. This type of configuration may be used to clear light-weight debris that may be spread along the entire length of the blade 13 of a road grader 10. In other embodiments, the lifter 12 and the exhaust tube 50 can be configured to move in unison according to a period.

In general, the debris blower system is operated for as long as the road grader 10 is in operation and blowable debris is present on the preceding road surface. Because the blower unit 30 can be controlled from the cab of a road grader 10, the debris blower system is generally activated only when needed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the debris blower system, suitable methods and materials are described above. All publications, patent applications, patents, and other references mentioned herein are incorporated by reference in their entirety to the extent allowed by applicable law and regulations. The debris blower system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A debris blower system, comprising:
    a mounting platform configured to mount to a road grader;
    a blower unit attached to the mounting platform;
    an exhaust tube comprising an inflow end and an outflow end;
    wherein the inflow end of the exhaust tube is coupled to the blower unit in a manner that permits it to rotate relative to the blower unit;
    wherein the exhaust tube comprises at least one bend between the inflow end and the outflow end; and
    a motor attached to the mounting platform, coupled to the exhaust tube, and configured to cause rotation of the inflow end of the exhaust tube relative to the blower unit to control the orientation of the outflow end of the exhaust tube;
    wherein the mounting platform is configured to be removably attached to the front end of a road grader, and wherein the outflow end of the exhaust tube can be configured to direct air from the blower unit onto to a road surface in front of the road grader in a manner that can clear debris from the road surface;
    wherein the road grader comprises a blade configured to contact a road surface beneath the road grader, wherein the outflow end of the exhaust tube can be configured to direct air from the road surface in a manner that can clear debris from the road surface in front of the blade.

2. The debris blower system of claim 1, further comprising at least one connector configured to detachably couple the debris blower system to a road grader.

3. The debris blower system of claim 1, wherein the exhaust tube is substantially rigid and comprises a single bend between the inflow end of the exhaust tube and the outflow end of the exhaust tube.

4. The debris blower system of claim 3, wherein the single bend between the inflow end and the outflow end of the exhaust tube is substantially ninety degrees.

5. The debris blower system of claim 1, wherein the motor and the blower unit are configured for remote control.

6. The debris blower system of claim 1, wherein the front end of the road grader comprises a lifter and the mounting platform is configured to be removably attached to the lifter, wherein the lifter is configured to alter the elevation of the mounting platform relative to the road surface.

7. The debris blower system of claim 6, wherein the lifter is configured for remote control by the operator of a road grader.

8. The debris blower system of claim 1, further comprising
    a chain operably coupled to the motor, and
    wherein the motor is configured to cause rotation of the inflow end of the exhaust tube relative to the blower unit using the chain.

9. The debris blower system of claim 8, wherein the inflow end of the exhaust tube is disposed within a sprocket, wherein the chain is operably coupled to the sprocket.

10. The debris blower system of claim 1, wherein the blower unit is powered by hydraulics.

11. The debris blower system of claim 10, wherein the motor is powered by hydraulics.

12. The debris blower system of claim 1, further comprising:
    at least one control unit configured to control the operation of at least one of the blower unit and the motor; and
    wherein the control unit is configured to interface with the controls of a road grader.

13. The debris blower system of claim 1, wherein the exhaust tube comprises a substantially uniform circular cross-section.

14. The debris blower system of claim 1, wherein the mounting platform comprises a substantially planar horizontal section and a substantially planar vertical section, wherein the vertical section is perpendicular to the horizontal section.

15. A debris blower system, comprising:
    a mounting platform;
    a blower unit attached to the mounting platform;
    an exhaust tube comprising an inflow end and an outflow end;
    wherein the inflow end of the exhaust tube is coupled to the blower unit in a manner that permits it to rotate relative to the blower unit;
    a motor attached to the mounting platform, coupled to the exhaust tube, and configured to alter the orientation of the outflow end of the exhaust tube relative to the blower unit;
    a lifter coupled to the mounting platform;
    at least one connector coupled to the lifter and configured to detachably couple the debris blower system to the front end of a road grader; and
    wherein the lifter is configured to modify the elevation of the mounting platform relative to at least one of the at least one connectors.

16. The debris blower system of claim 15, wherein the motor is configured to periodically alter the orientation of the outflow end of the exhaust tube.

17. The debris blower system of claim 15, wherein the exhaust tube is substantially rigid and comprises a substantially uniform circular cross-section.

18. The debris blower system of claim 15, wherein the lifter, motor and blower unit are powered by hydraulics; and wherein the lifter, motor, and blower unit can be configured for remote control by an operator of the road grader.

19. A debris blower system, comprising:
a mounting platform configured to mount to a road grader;
a blower unit attached to the mounting platform;
an exhaust tube comprising an inflow end and an outflow end;
wherein the inflow end of the exhaust tube is coupled to the blower unit in a manner that permits it to rotate relative to the blower unit;
wherein the exhaust tube comprises at least one bend between the inflow end and the outflow end; and
a motor attached to the mounting platform, coupled to the exhaust tube, and configured to cause rotation of the inflow end of the exhaust tube relative to the blower unit to control the orientation of the outflow end of the exhaust tube;
wherein the mounting platform is configured to be removably attached to the front end of a road grader, and wherein the outflow end of the exhaust tube can be configured to direct air from the blower unit onto to a road surface in front of the road grader in a manner that can clear debris from the road surface;
wherein the front end of the road grader comprises a lifter and the mounting platform is configured to be removably attached to the lifter, wherein the lifter is configured to alter the elevation of the mounting platform relative to the road surface.

20. The debris blower system of claim 19, wherein the lifter is configured for remote control by the operator of a road grader.

* * * * *